United States Patent [19]

Jensen

[11] 4,334,346

[45] Jun. 15, 1982

[54] METHOD AND APPARATUS FOR FABRICATING STUDS, JOISTS AND THE LIKE

[75] Inventor: Keith A. Jensen, Sandy, Utah

[73] Assignees: A. Park Smoot, Murray; Reese J. Goodwin, Provo, both of Utah

[21] Appl. No.: 72,349

[22] Filed: Sep. 4, 1979

[51] Int. Cl.³ ........................ B23P 19/00; B23P 21/00; B23Q 15/00; B27F 7/02

[52] U.S. Cl. ........................................ 29/429; 29/432.1; 29/469.5; 29/716; 29/798; 29/809; 52/696; 156/92; 227/45; 227/50; 227/100

[58] Field of Search ........................ 29/432, 432.1, 429, 29/818, 430, 809, 798, 716, 469.5; 156/92; 227/74, 45, 50, 99, 100; 52/696

[56] References Cited

U.S. PATENT DOCUMENTS

| | | | |
|---|---|---|---|
| 1,244,870 | 10/1917 | Levens | 52/696 |
| 2,531,375 | 11/1950 | Delegard et al. | 156/92 |
| 2,622,999 | 12/1952 | Faussner | 156/92 |
| 3,298,151 | 1/1967 | Jureit | 52/696 X |
| 3,765,587 | 10/1973 | Davis | 227/100 |
| 3,822,815 | 7/1974 | Davis | 227/100 |
| 4,031,604 | 6/1977 | Jureit | 227/100 X |
| 4,160,350 | 7/1979 | Craib | 52/696 |
| 4,175,313 | 11/1979 | Neumann | 29/432 X |

*Primary Examiner*—Charlie T. Moon
*Attorney, Agent, or Firm*—Thorpe, North & Western

[57] ABSTRACT

Studs, joists, trusses and similar construction members having a pair of generally parallel chords and blocks disposed between the chords are manufactured by placing a plurality of blocks on a moving surface, with the blocks being spaced apart generally in a line along the direction of movement. A pair of chords are placed on each side of the line of blocks and are moved along with the blocks. The chords and blocks are moved past apparatus which drives fastening elements through the chords and into the blocks to secure the chords and blocks together in a rigid construction. Spacer lock plates may also be used to separate and lock the two chords in position, each spacer lock plate including opposed cuts on opposite edges thereof for receiving the chords, a stem portion between the cuts, and toothed flanges at each side of the stem portion. A chord is placed in each cut of each plate and then the chords and plates are moved through a first set of rollers to fold the flanges of the plates toward the chords to lie generally parallel with the axes of the chords. The chords and plates are then moved through a second set of rollers to press the flanges against and embed the flanged teeth in the chords.

26 Claims, 6 Drawing Figures

METHOD AND APPARATUS FOR FABRICATING STUDS, JOISTS AND THE LIKE

BACKGROUND OF THE INVENTION

The present invention relates to assembly methods and apparatus for fabricating construction members which include a pair of generally parallel chords and a plurality of blocks disposed and fixed between the chords.

In copending patent application, Ser. No. 36,385, a simple, lightweight and sturdy construction member for use in place of conventional studs, trusses, joists and the like is disclosed. This construction member includes a pair of chords arranged in a parallel, spaced apart relationship and a plurality of blocks disposed between and joining the chords. This arrangement provides openings in the construction member which not only reduce the weight of member but also facilitate the easy passage through the member of accessory elements such as wiring, plumbing, etc.

The need for a construction member as described in the aforecited copending application arises from the dramatic increase of construction costs in recent years which in large part is due to the increased cost of conventional construction materials and shortage of construction grade lumber. For wood construction, such materials typically consist of heavy, solid lumber, 2×4's, 2×6's, etc. It is felt that the above-described construction member provides a desirable alternative to the solid lumber studs, trusses and joists presently being used in the construction industry.

It is apparent that the economy in using the construction members described depends in part on the cost of manufacturing or fabricating such construction members. Although manufacturing methods and apparatus have been disclosed for manufacturing other types of trusses or wooden construction members (see U.S. Pat. Nos. 3,413,703, 3,903,583, 4,033,025, and 4,047,282), applicant herein is unaware of any manufacturing method or apparatus which could be utilized in manufacturing the above-identified construction member.

In view of the above, it is an object of the present invention to provide a simple and economical method and apparatus for fabricating a construction member which is composed of a pair of chords, and a plurality of blocks disposed between and joining the chords.

It is also an object of the invention to provide such a method and apparatus which is substantially automated.

It is a further object of the invention, in accordance with one aspect thereof, to provide a method and apparatus for fabricating a construction member composed of two generally parallel chords joined by spacer lock plates which include a plate having opposed cuts on opposite edges thereof, a stem portion between the cuts, and toothed flanges on each side of the stem portion and cuts.

SUMMARY OF THE INVENTION

The above and other objects of the invention are realized in a specific illustrative embodiment thereof in which is provided a moving surface having a plurality of block holders spaced apart generally in a line along the direction of movement. Also provided are contacting elements on the moving surface generally in line with the block holders for contacting and moving chords placed along each side of the line of block holders. Blocks are placed in the block holders and a pair of chords are placed in a generally parallel relationship on each side of the line of block holders so that the contacting elements contact the ends of the chords to move the chords along with the moving surface. The chords and blocks are moved past securing apparatus which secures the chords to the blocks. One type of securing apparatus which might be used would be a pair of pneumatic stapling guns positioned on each side of the path of movement of the chords and blocks. As a block passes between the staple guns, the guns would automatically drive staples through the chords into the block.

In accordance with one aspect of the invention, spacer lock plates are used along with the blocks to secure the pair of chords in a rigid construction. Each spacer lock plate includes a generally flat plate having opposed cuts on opposite edges thereof for receiving the chords, a stem portion between the cuts, and toothed flanges at each side of the stem portion and cuts. Plate holding apparatus is provided on the moving surface and plates are placed in the plate holders to be generally perpendicular to the direction of movement of the moving surface and so that the cuts face laterally outwardly of the direction of movement. Chords are then placed in the cuts of the plates and the chords, blocks and plates are moved through a first set of rollers to fold at least one of the flanges of each plate toward the chords to lie generally parallel with the axes of the chords. The chords, blocks and plates may then be moved through a second set of rollers to more firmly press the flanges of the plates against the chords and embed the flanged teeth in the chords.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
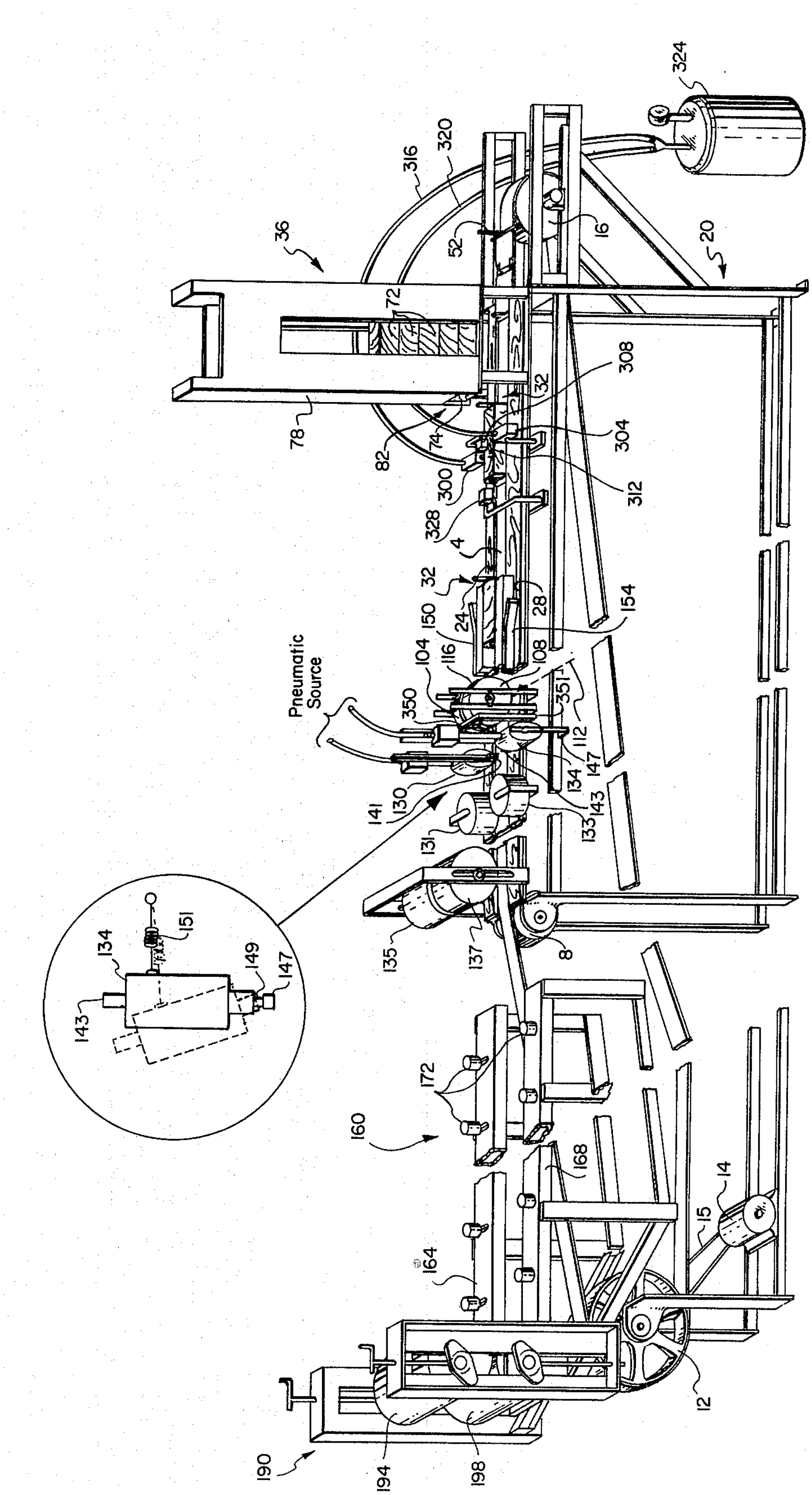
FIG. 1 is a perspective, partially fragmented view of construction member fabricating apparatus made in accordance with the principles of the present invention.
Figure 2:
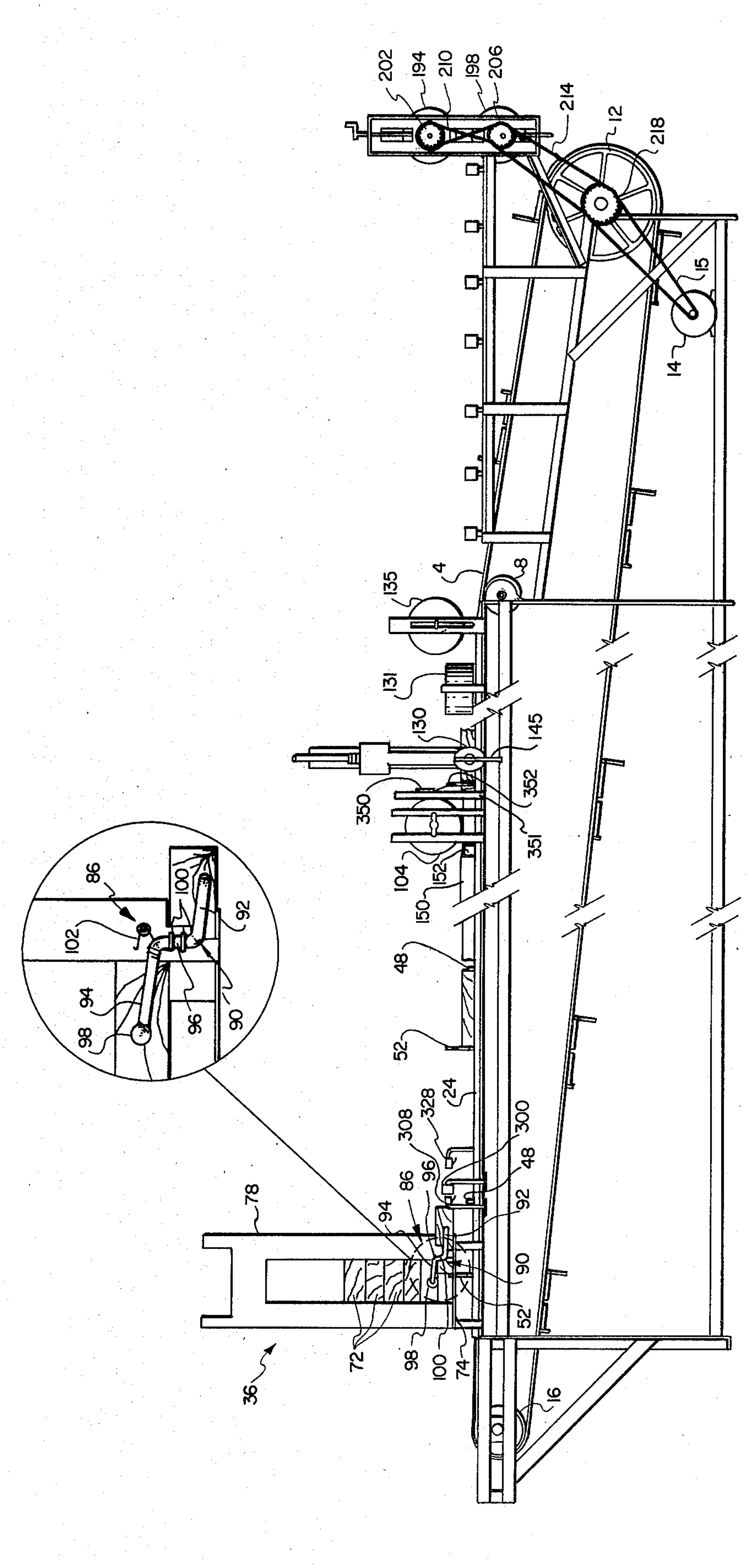
FIG. 2 is a side, elevational view of the apparatus of FIG. 1.
Figure 4:
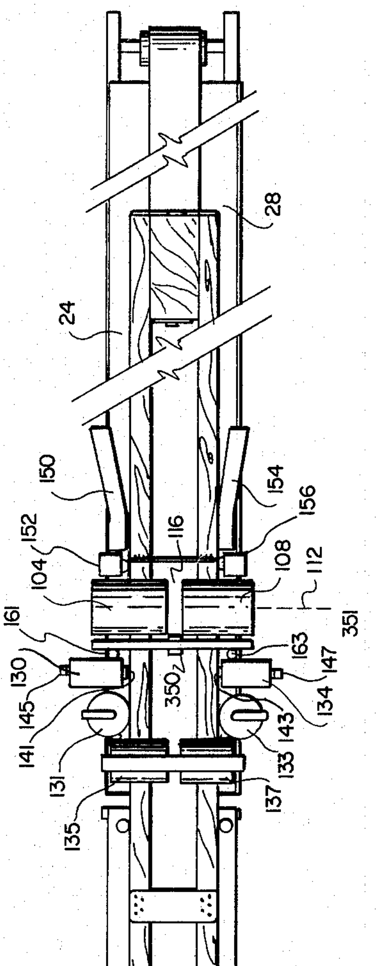
FIG. 4 is a top plan view of the apparatus of FIG. 1.

Referring now to the drawings, there is shown a perspective view in FIG. 1, a side elevational view in FIG. 2, and a top plan view in FIG. 4 of apparatus for fabricating construction members having a pair of generally parallel chords and either blocks, spacer lock plates, or a combination thereof disposed between the chords. These construction members have been more particularly described in the aforecited copending patent application, Ser. No. 36,385, filed by the applicant herein.

The apparatus of the drawings includes a movable belt 4 disposed to move on the rollers 8, 12, and 16. The rollers 8, 12 and 16 are rotatably supported in a base framework 20 which may be of any suitable type construction. Roller 12 is driven by an electric motor 14, via a drive belt or chain 15, to thus move the belt 4. Positioned on either side of the belt 4 to present a generally upward facing surface which is at a level just above the upper surface of the belt 4 are a pair of elongate platforms 24 and 28.

Figure 3:
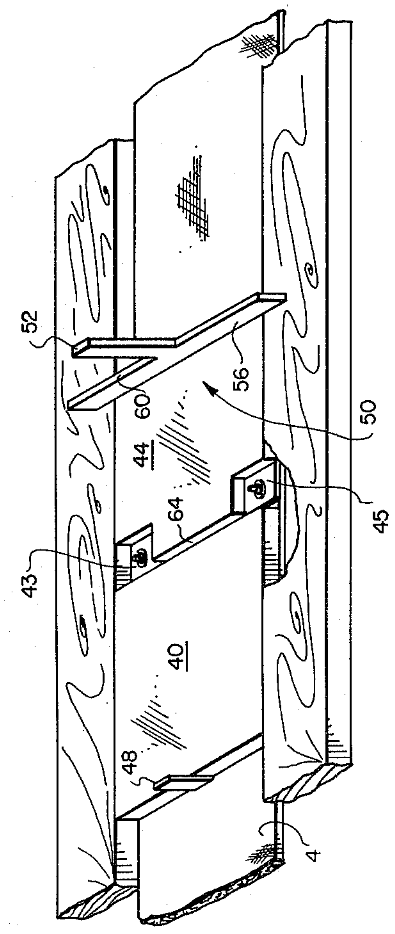
FIG. 3 is a detailed perspective view of a block holder and plate holder.

Disposed on the surface of the belt are a plurality of block holders 32 for receiving blocks from a block dispenser 36 and for holding the blocks on the upper surface of the belt 4 in a spaced apart relationship along the direction of travel of the belt. The block holder 32 is shown in greater detail in FIG. 3 to include first and second platforms 40 and 44 spaced apart longitudinally along and fixed to the belt 4. Located on the leading edge of the platform 40 is a tab or stop 48 for confining and restraining a block placed on the block holder 32 from sliding forwardly. Disposed at the trailing edge of platform 44 is a contacting element 50 formed in the shape of an inverted T to include an upstanding leg 52 and two laterally extending legs 56 and 60. As will be described in more detail later, leg 52 is provided to contact and force a block from the block dispenser 36 (FIG. 1) as the block holder passes underneath the dispenser. Legs 56 and 60 are provided for contacting the ends of a pair of chords placed on the platforms 24 and 28 to move the chords along with the movement of the belt and are provided only on every third, fourth, fifth, etc., block holder (depending on the length of the chords), so that the chords may rest on the platforms 24 and 28 (FIG. 1) and against the side of the blocks, without interference from such legs. Thus, legs 56 and 60 are provided only on those block holders which will act to contact the rear ends of each pair of chords. These legs could take a variety of shapes including being formed to project fowardly to hold the trailing ends of the chords forwardly of the trailing end of the block. This would facilitate fabrication of construction members such as those shown in U.S. patent application, Ser. No. 36,385. The platforms 40 and 44 may be attached to the belt by any suitable fastening means including rivets, bolts or adhesive, and the tab 48 and contacting elements 50 may similarly be attached to corresponding platforms 40 and 44 by any suitable fastening means.

Figure 5:
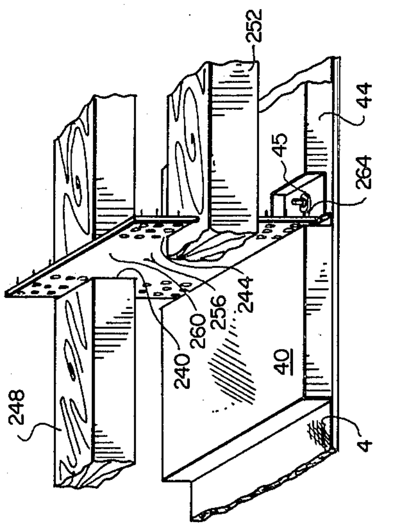
FIG. 5 is a perspective view of the plate holder of FIG. 3 showing a spacer lock plate disposed in the plate holder.

The platforms 40 and 44 are spaced apart to provide a gap 64 into which a spacer lock plate similar to those disclosed in copending application, Ser. No. 906,067, may be placed. An exemplary of such plate is shown in FIG. 5 positioned in the gap between the platforms 40 and 44. This plate includes a generally flat sheet of metal having opposed cuts 240 and 244 on opposite edges thereof of a size sufficient to receive chord 248 and 252, a stem portion 256 located between the cuts, and toothed flanges 260 and 264 at each side of the stem portion and cuts, all as more particularly described and shown in the cited copending application. As shown in FIG. 5, the spacer lock plates are placed in the plate holders (gaps between the platforms) generally perpendicular to the direction of movement of the belt 4. The cuts 240 and 244 face laterally outwardly to receive chords as also shown in FIG. 5. Cutouts 43 and 45 are provided in platform 40 to accommodate the teeth of flanges 260 and 264, which project perpendicularly of the plates.

If spacer lock plates are not used in the construction of the construction member, then platforms 40 and 44 would not be necessary, and the tab 48 and contacting element 50 would be attached directly to the belt 4. The blocks would then be placed directly on the belt between the tab 48 and contacting element 50.

Referring again to FIGS. 1, 2 and 4, there is shown the block dispenser 36 positioned above the belt 4 and held in place by any suitable support structure. The dispenser 36 includes a vertically elongate housing open at the top for receiving blocks and having an interior dimension which corresponds generally to the exterior dimension of the desired blocks. The blocks, such as blocks 72, are stacked one upon the other in the housing, with the bottommost block resting on side rails 74. The front end of the dispenser housing is closed by a wall 78, except for an opening 82 located at the bottom of the housing. This opening is of a sufficient size to allow the bottommost block to slide forwardly of the dispenser and onto the belt, while preventing the block just above the bottommost block from sliding forward. With this construction, the block dispenser 36 allows one block at a time to be dispensed onto the belt as will next be described.

As a block holder 32 is moved underneath the block dispenser 36, the upright leg 52 of the contacting element 50 engages the rear end of the bottommost block in the dispenser 36 (see FIG. 2). As the belt 4 moves forwardly carrying the block holder and contacting element, the upright leg 52 pushes the bottommost block out the opening 82 in the front of the dispenser housing and onto the block holder. The front tab 48 (FIG. 3) restrains the block from sliding forwardly off the block holder and the contacting element 50 prevents the block from sliding rearwardly, to thereby maintain the block on the block holder. As the bottommost block is slid from the dispenser 36, the stack of blocks 72 moves downwardly under gravity until the then bottommost block rests upon the side rails 74.

A block restraining mechanism 86 (FIG. 2) prevents the stack of blocks 72 from dropping or tipping at a screwed angle downwardly in the block dispenser 36 to ensure that the blocks do not bind in the dispenser in such a fashion that they cannot be dispensed onto the belt. The block restraining mechanism 86 includes a pivotal element 90 having a contact arm 92 and a restraining arm 94 joined to opposite ends of a pivoting axle 96 which, in turn, is pivotally mounted by brackets or loops 100 to a side of the block dispenser 36. A rubber guard 98 is mounted on the end of the restraining arm 94. As a block is moved forwardly from the dispenser, the block contacts the contact arm 92 causing the pivoting member to pivot about the axle 96 and force the restraining arm 94 to engage a block of wood located above the block being dispensed. This action of the restraining arm 94 pressing against such a block forces the block against the side walls of the dispenser to prevent downward movement of the stack of blocks 72. When the bottommost block leaves the dispenser and is moved out of contact with the contact arm 92 a spring 102 causes the pivoting member to pivot and move the restraining arm 94 away from the stack of blocks. The stack is thus allowed to move downwardly in the block dispenser to await arrival of the next block holder. In this fashion, the stack of blocks is prevented from tipping downwardly at the rear ends thereof, for example, as the bottommost block is forced from the dispenser. If this were allowed to occur, it is possible that the blocks would bind in the dispenser and not move downwardly as required and the block dispensing operation would be stopped.

After the blocks are dispensed into the block holders 32 on the belt 4, glue or suitable adhesive is applied to the sides of the blocks by glue dispensers 300 and 304. The glue dispensers are mounted above side platforms 24 and 28 so that the blocks, when in the block holders, will pass between the dispensers. A first block detection switch 308 is positioned above the belt 4 and between the glue dispensers 300 and 304 to detect the arrival of a block. The switch 308 includes a feeler element 312 which depends from the switch housing to be contacted by a block being carried by the belt. A block forces the feeler element 312 forwardly to operate the switch and causes it to operate the glue dispensers 300 and 304 so that they apply glue to the sides of the block as the block passes between the dispensers. The glue dispensers 300 and 304 operate pneumatically and are thus connected by hoses 316 and 320 to a tank 324 for holding air under pressure. The glue dispensers 300 and 304 are conventional in design and might illustratively be solenoid operated glue guns, model A7A, made by Nordson Co.

Eventually each block carried by the belt reaches a second block detection switch 328 which, upon detecting the arrival of a block, signals the glue dispensers 300 and 304 to stop dispensing glue. The detection switch 308 is positioned above the belt 4 in a location to shut off the glue dispensers 300 and 304 just before a block passes by the dispensers. The switch 328, like the switch 308, includes a feeler element for contacting the blocks, and is of conventional design. The glue dispensers 300 and 304 and switches 308 and 328 may be mounted by any suitable support structure in the positions indicated.

Figure 6:
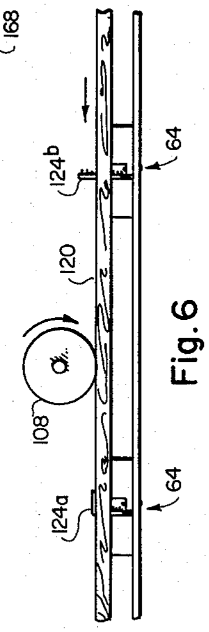
FIG. 6 is a graphic side view illustrating the operation of rollers 104 and 108 of FIG. 1.

Also included with the apparatus of FIGS. 1, 2 and 4 are a pair of split rollers 104 and 108 disposed above the belt 4 and arranged to rotate about a horizontal axis 112. A gap 116 separates the rollers to allow passage therethrough of the upright legs 52 of the contacting elements 50. The function of the rollers 104 and 108 is to press the top flanges of the spacer lock plates downwardly toward chords of a construction member as the plates and chords pass under the rollers. In particular, the rollers 104 and 108 press the uppermost flange toward the two chords so that the flange is generally parallel with the axis of the chords. This is graphically illustrated in FIG. 6 which shows a side elevational view of a chord 120 positioned in the cuts of a plurality of plates 124 which, in turn, are carried by plate holders 64. As the plate holders pass under the rollers, including roller 108, the uppermost flange of the plates are forced downwardly toward the top surface of the chord 120 such as shown for plate 124*a*. Plate 124*b* is shown approaching the roller 108 and the top flange of this plate would similarly be pressed downwardly after passing under the rollers.

If spacer blocks only are used to separate the chords, then the rollers 104 and 108 would serve no function other than to maintain a horizontal alignment of the chords and blocks as they were carried by the moving belt 4. If spacer blocks only are used, then the chords and blocks pass under the rollers 104 and 108 and between a pair of automatically operable pneumatic staple guns 130 and 134. The staple guns are conventional in design and are positioned in an opposing relationship above and on either side of the belt 4 so that a pair of chords with spacer blocks disposed there between can pass between the guns at a level to allow driving staples through the chords into the blocks.

The pneumatic guns are triggered when a contacting element 52 of a block holder 32 contacts still another detection switch 350 (see FIGS. 1, 2, and 4) which is held in place above the belt by a brace 351. This switch includes a feeler element 352 which, when moved by a contacting element 52 (which would be behind a block), operates the switch to in turn cause operation of the pneumatic guns. The switch 350 is positioned so that when a contacting element 52 contacts the switch, the corresponding block positioned in front of the contacting element is located directly between the staple guns so that the chords are stapled to the block. Exemplary staple guns are made by Duo Fast, Inc. The guns are operated by a conventional pneumatic source not shown.

The staple guns 130 and 134 are mounted so that the dispensing ends of the guns 141 and 143 pivot or move in the direction of movement of the belt 4. This is done so that the stapling operation will not inhibit movement of the belt and construction members. That is, during the time that the guns are in contact with the chords of the construction members, the dispensing ends of the guns simply move with the chords. The staple guns 130 and 134 are mounted on support members 145 and 147 respectively to pivot about a pivot point, such as pivot point 149 in FIG. 1. Illustratively, a conventional hinge could be used to mount the rear end of the guns onto the support members 130 and 134 to facilitate the pivoting action. After a staple gun has applied a staple to a chord, pivoted with the chord, and then released, springs, such as spring 151, pull the guns back to the non-pivoted positions. The springs are coupled to the sides of the guns and then to any suitable support structure such as the brace 351.

In order to maintain the two chords snuggly against the sides of the spacer blocks, a pair of guide rails 150 and 154 are mounted on the platforms 24 and 28 respectively. These guide rails extend from near the rollers 104 and 108 toward the front or source end of the assembly apparatus. The spacing between the guide rails is greatest toward the front end of the apparatus and narrowest to their closest point near the rollers 104 and 108. The spacing of the guide rails 150 and 154 near the rollers 104 and 108 is just slightly greater than the combined thickness of a pair of chords with spacer blocks disposed therebetween. Positioned between the rollers 104 and 108, and the rear ends of the guides 150 and 154 are a pair of rollers 152 and 156 (FIG. 4) disposed to rotate about generally vertical axis. With this configuration, when a pair of chords are placed on either side of a line blocks and are moved toward the rollers 104 and 108 by a contacting element, the guide rails 150 and 154 and rollers 152 and 156 tend to urge the two chords snuggly against the spacer blocks disposed therebetween. The guide rails 150 and 154 could be constructed of any suitable material including wood, metal, etc.

A second pair of rollers 161 and 163 (FIG. 4) are positioned on either side of the belt 4 to further press the chords against the blocks just prior to stapling.

After a construction member passes between the stapling guns 130 and 134, it is guided and maintained in a proper vertical alignment by a pair of rollers 131 and 133, which are mounted to rotate about vertical axes, and in a proper horizontal alignment by a pair of rollers 135 and 137, which are mounted to rotate about horizontal axes. The rollers 135 and 137 guide the construction members onto a carrying table 160 having a pair of generally parallel, spaced-apart upper rails 164 and 168, and prevent the members from "riding" upwardly from the rails. These rails are held in place by any suitable support structure. Disposed on top of each of the rails 164 and 168 are a plurality of laterally moveable guide rollers 172 disposed generally in a line along the top of each of the rails and mounted to rotate about a generally vertical axis. The function of the rollers 172 is to confine the forward portion of the construction members therewithin and to guide the construction members toward a final set of pressure rollers 190. The rails 164 and 168 support the construction members as they are pushed thereover by the belt 4 and contacting elements mounted on the belt. It should be understood that other types of guide structure could be used in place of the rollers 172, such as guide rails.

As the belt 4 approaches the rails 164 and 168, it begins to descend toward roller 12 to thus move away from any construction member being carried by the belt (see FIGS. 1 and 2). This action causes the release of blocks and spacer lock plates by the block holders and plate holders on the belt (when spacer lock plates are used) for the approach of the plates to rollers 190 to next be discussed.

The set of rollers 190 is provided primarily for use in the fabrication of construction members which utilize the spacer and lock plates. The rollers 190 also perform a leveling or straightening action on the construction member, and so are useful even if spacer and lock plates are not used. The set of rollers 190 is provided to compress the flanges of the spacer and lock plates against the chords to embed the flanged teeth into the chords, and to pull the construction member from the assembly apparatus. The set of rollers 190 includes a roller 194 disposed above a second roller 198, with both being arranged to rotate about generally horizontal and parallel axes. The rollers are caused to rotate in opposite directions as indicated in FIG. 2. Driven pulleys 202 and 206 are mounted on the axles of rollers 194 and 198 respectively and are connected by a driving belt or chain 210. Driven pulley 206, in turn, is coupled by a driving chain 214 to a drive pulley 218. The drive pulley 218 is connected to the axle of a belt driving wheel 222. The driven pulleys 202 and 206 and drive pulley 218 are sized so that the rollers 194 and 198 will rotate at a speed which will cause the construction member to be moved therethrough at the same speed that the belt 4 moves. When the construction member is introduced between the rollers 194 and 198 the rollers in effect grasp the construction member and pull it along the rails 164 and 168 to compress the spacer and lock plates and embed the flanged teeth into the chords.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of manufacturing studs, joists, and the like which have a pair of side-by-side chords, and blocks disposed between the chords, said method including (a) providing a conveying surface having a plurality of block holders spaced apart generally in a line along the direction of movement, each block holder including means for holding a block and for maintaining separation of the block from adjacent blocks and also including an upstanding finger disposed at the rear end of the holder, (b) providing contacting elements on the conveying surface to be generally in line with the block holders for contacting and moving chords placed along each side of the line of block holders, (c) providing a block holding bin adjacent to the conveying surface for holding a plurality of blocks in a stack, and moving the block holders past the bin so that each upstanding finger contacts the bottommost block in the bin and forces the block from the bin into the corresponding block holder so that at least two blocks are carried in respective adjacent block holders, (d) placing in a generally parallel relationship a pair of chords on each side of a line of two or more block holders which are holding blocks so that the contacting elements contact the ends of the chords and move the chords, (e) forcing the chords into contact with the blocks, and (f) moving the chords and blocks through securing apparatus which secures the chords to the blocks.

2. A method as in claim 1 wherein step (c) further includes providing a block restraining means for contacting a block above the bottommost block in the bin as the bottommost block is forced from the bin to thereby prevent the blocks above the bottommost block from moving downwardly in the bin until after the bottommost block has been forced from the bin.

3. A method as in claim 1 wherein step (f) includes driving fastening elements such as staples, nails or the like through the chords into the blocks.

4. A method as in claim 3 wherein said driving step comprises driving the fastening elements in opposed directions through the chords into the blocks.

5. A method as in claim 4 wherein said driving step further comprises providing a triggering element above the moving surface and positioned so that it will be contacted and moved by each block holder as each block holder passes under the triggering element, and driving the fastening elements through the chords into the blocks when the triggering element is moved.

6. A method as in claim 4 further including the step of applying adhesive to each side of each block prior to forcing the chords into contact with the blocks.

7. A method as in claim 6 wherein said applying step comprises moving the blocks past adhesive applicators positioned on each side of the path of travel of the blocks, and applying adhesive to the blocks as the blocks move past the applicators.

8. A method as in claim 1 wherein step (a) comprises moving the moving surface at an angle downwardly from the horizontal after the blocks carried by the moving surface have passed through the securing apparatus.

9. A method as in claim 1 further including (g) providing a plurality of plate holders on the moving surface for holding spacer lock plates in an upstanding position, the spacer lock plates each including opposed cuts on opposite edges thereof for receiving chords, a stem portion between the cuts, and toothed flanges at each side of the stem portion and cuts, (h) placing a spacer lock plate in each plate holder so that the plate is generally perpendicular to the direction of movement of the moving surface, with the plate positioned so that the cuts face laterally of the direction of movement, (i) placing a chord in each cut of each plate, and (j) moving the chords, blocks and plates through a set of rollers to fold a flange or the flanges of each plate toward the chords to lie generally parallel with the axes of the chords.

10. A method as in claim 9 further including moving the chords, blocks and plates through a second set of rollers to press the flanges of the plates against the chords and embed the flange teeth in the chords.

11. A method as in claim 10 wherein step (f) comprises moving the moving surface at an angle downwardly from the horizontal before the blocks and plates carried by the moving surface reach the second set of rollers.

12. Apparatus for use in assembling studs, joists, and the like which have a pair of side-by-side chords, and blocks disposed between the chords, said apparatus including a conveying surface having a plurality of block holders positioned thereon and spaced apart generally in a line along the direction of movement, each block holder including means for holding a block in a fixed position on the conveying surface, and an upstanding finger disposed at the rear end of the holder, a plurality of contacting elements positioned on the conveying surface and spaced apart generally in line with the block holders for contacting the rear ends of the chords placed on each side of the block holders to move the chords as the conveying surface is moved, guide means disposed on each side of the line of travel of the blocks and chords for guiding and urging the chords into contact with the blocks, block holding bin means disposed adjacent the conveying surface for holding a plurality of blocks in a stack, said bin means including side walls for maintaining the blocks in a stack, support rails disposed at the bottom of the side walls for supporting the blocks at the sides thereof and for allowing the bottommost block to slide forwardly of the bin means, and a front wall joined to the side walls and having an opening at the bottom thereof of a size sufficient to allow the bottommost block in the stack to be slid forwardly of the bin means and out of the bin means while preventing the other blocks from sliding forwardly, and securing means for driving fastening elements such as staples, nails or the like through the chords into the blocks.

13. Apparatus as in claim 12 wherein each block holder further includes a second upstanding finger having a height less than that of the first mentioned finger and positioned at the front of the holder for restraining forward movement of a block from out of the holder.

14. Apparatus as in claim 12 wherein said block holder bin means further includes a block restraining means for contacting a block above the bottommost block in the bin means as the bottommost block is forced from the bin means to thereby restrain the stack of blocks from falling downwardly until after the bottommost block has been forced from the bin means.

15. Apparatus as in claim 14 wherein said block restraining means includes a pivot arm pivotally mounted on a side wall of the bin means to pivot between a first position, in which a first end of the pivot arm is out of contact with any block in the bin means, and a second position, in which a second end of the pivot arm is contacted and moved by a block being forced from the bin means to thereby cause the pivot arm to pivot so that the first end of the pivot arm contacts a block above the bottommost block to force it against a bin means side wall and prevent downward movement of the block, and biasing means for normally biasing the pivot arm to the first position.

16. Apparatus as in claim 12 wherein said securing means includes a triggering element disposed above the conveying surface and positioned so that it will be contacted and moved by each block holder as each block holder passes under the triggering element, a pair of gun means positioned on each side of the line of travel of the blocks and chords for firing to drive staples or nails through the chords into the blocks, and switch means responsive to movement of the triggering element for causing said gun means to fire.

17. Apparatus as in claim 16 wherein said pair of gun means each include a dispensing end from which the staples or nails are dispensed, and wherein said securing means further includes means for mounting said gun means to enable the dispensing ends of the gun means to move from a rest position in the direction of movement of the conveying surface when staples or nails are being dispensed, and means for biasing the gun means to return to the rest positions.

18. Apparatus as in claim 17 wherein said gun means are each pivotally mounted on respective mounting means to enable the dispensing ends to pivot in the direction of movement of the conveying surface.

19. Apparatus as in claim 12 further including adhesive dispensing means for applying adhesive to each side of each block.

20. Apparatus as in claim 19 wherein said adhesive dispensing means includes a pair of adhesive guns positioned on each side of the line of travel of the blocks for applying adhesive to each side of each block, feeler means disposed above the conveying surface and positioned so that it will be contacted and moved by each block as the block passes under the feeler means, and switch means responsive to movement of the feeler means for causing said adhesive guns to dispense adhesive.

21. Apparatus as in claim 20 further including guide means disposed on each side of the line of travel of the blocks and chords for guiding and forcing the chords into contact with the blocks after adhesive is applied to the blocks.

22. Apparatus as in claim 12 further including means for directing the conveying surface to move generally along a horizontal line for a certain distance beyond the securing means, and for then directing the conveying surface to move at an angle downwardly from the horizontal.

23. Apparatus as in claim 12 further including a plurality of plate holders mounted on the conveying surface for holding generally flat plates in an upstanding position so that the plates move in a direction generally perpendicular to the plane of the plates.

24. Apparatus as in claim 23 wherein said plate-holders each include a pair of platforms attached to the conveying surface and spaced apart to define a gap therebetween for receiving and holding a plate, said platforms being disposed in said block holders to support the blocks placed in the block holders.

25. Apparatus as in claim 23 wherein the plates each include opposed cuts on opposite edges thereof for receiving chords, a stem portion between the cuts, and toothed flanges at each side of the stem portion and cuts, and wherein the apparatus further includes roller means disposed along the line of travel of the movable surface for contacting and pressing the flanges of the plates toward the chords to embed the flange teeth in the chords.

26. Apparatus as in claim 25 wherein said roller means comprises a first set of rollers to press the uppermost flange of each plate toward the chords, and a second set of rollers to press the uppermost flange and lowermost flange of each plate onto the chords.

* * * * *